United States Patent
Lego et al.

(10) Patent No.: US 7,937,305 B1
(45) Date of Patent: May 3, 2011

(54) METHODS AND SYSTEMS FOR ANALYZING THE STATUS OF AN ENTITY AND ITS FINANCIAL TRANSACTIONS

(75) Inventors: Michael J. Lego, Bridgeville, PA (US);
Katherine Kallet, Pittsburgh, PA (US);
Katina Bengtson, Pittsburgh, PA (US)

(73) Assignee: The PNC Financial Services Group, Inc., Pittsburgh, PA (US)

( * ) Notice: Subject to any disclaimer, the term of this patent is extended or adjusted under 35 U.S.C. 154(b) by 0 days.

(21) Appl. No.: 11/796,371

(22) Filed: Apr. 27, 2007

Related U.S. Application Data

(63) Continuation of application No. 10/033,596, filed on Dec. 28, 2001, now abandoned.

(51) Int. Cl.
*G06Q 40/00* (2006.01)

(52) U.S. Cl. ........................................ 705/35; 705/36 R

(58) Field of Classification Search ................... 705/35, 705/45, 27, 40, 78, 36 R, 38; 370/467
See application file for complete search history.

(56) References Cited

U.S. PATENT DOCUMENTS

| | | | |
|---|---|---|---|
| 4,346,442 A * | 8/1982 | Musmanno ................. | 705/36 R |
| 4,989,141 A | 1/1991 | Lyons et al. | |
| 5,093,787 A | 3/1992 | Simmons | |
| 5,412,190 A * | 5/1995 | Josephson et al. ............. | 705/45 |
| 5,649,116 A * | 7/1997 | McCoy et al. ................. | 705/38 |
| 5,696,907 A | 12/1997 | Tom | |
| 5,699,528 A | 12/1997 | Hogan | |
| 5,704,045 A | 12/1997 | King et al. | |
| 5,706,442 A * | 1/1998 | Anderson et al. ............... | 705/27 |
| 5,734,890 A | 3/1998 | Case et al. | |
| 5,761,441 A | 6/1998 | Bennett | |
| 5,793,771 A * | 8/1998 | Darland et al. ............... | 370/467 |
| 5,839,118 A | 11/1998 | Ryan et al. | |
| 5,875,431 A | 2/1999 | Heckman et al. | |
| 5,875,437 A | 2/1999 | Atkins | |
| 5,930,764 A | 7/1999 | Melchione et al. | |
| 5,940,809 A * | 8/1999 | Musmanno et al. ............ | 705/35 |
| 5,991,750 A | 11/1999 | Watson | |
| 6,016,482 A | 1/2000 | Molinari et al. | |
| 6,018,721 A | 1/2000 | Aziz et al. | |
| 6,018,723 A | 1/2000 | Siegel et al. | |
| 6,049,782 A | 4/2000 | Gottesman et al. | |
| 6,055,505 A | 4/2000 | Elston | |

(Continued)

OTHER PUBLICATIONS

Conal Gregory, It can pay to watch out for those hidden bank charges, The Scotsman, p. 37, Jan. 23, 1999.*

(Continued)

*Primary Examiner* — Dilek B Cobanoglu
(74) *Attorney, Agent, or Firm* — K&L Gates LLP

(57) ABSTRACT

Methods and systems are provided for processing the financial information of a client of a financial institution. One method embodiment includes receiving data from an overdraft data source including at least one overdraft occurrence associated with a transaction performed in association with the client; analyzing the overdraft occurrence in an overdraft application to determine a cause and disposition of the overdraft occurrence in connection with the cause of the overdraft occurrence; and, communicating an overdraft report associated with the analyzing step to a manager associated with the client. Additional system and computer-readable medium embodiments of the present methods are also provided. In another aspect of the present methods and systems, historical overdraft issues are analyzed and reported to the management of a financial institution. System and computer-readable medium embodiments of these analysis and reporting methods are also provided.

33 Claims, 14 Drawing Sheets

U.S. PATENT DOCUMENTS

| | | | |
|---|---|---|---|
| 6,078,905 | A | 6/2000 | Pich-leWinter |
| 6,119,103 | A | 9/2000 | Basch et al. |
| 6,119,104 | A | 9/2000 | Brumbelow et al. |
| 6,128,599 | A | 10/2000 | Walker et al. |
| 6,128,603 | A * | 10/2000 | Dent et al. .................... 705/40 |
| 6,138,102 | A | 10/2000 | Hinckley, Jr. |
| 6,161,098 | A | 12/2000 | Wallman |
| 6,182,048 | B1 | 1/2001 | Osborn et al. |
| 6,202,053 | B1 | 3/2001 | Christiansen et al. |
| 6,205,434 | B1 | 3/2001 | Ryan et al. |
| 6,226,624 | B1 | 5/2001 | Watson et al. |
| 6,272,472 | B1 * | 8/2001 | Danneels et al. ............. 705/27 |
| 2001/0034701 | A1 | 10/2001 | Fox et al. |
| 2002/0120587 | A1 * | 8/2002 | D'Agostino ................... 705/78 |
| 2003/0036993 | A1 | 2/2003 | Parthasarathy |
| 2010/0250422 | A1 | 9/2010 | Lego et al. |

OTHER PUBLICATIONS

Kirsty Greenwood and Nic Cicutti, Personal Finance: Switching isn't hard to do: More people divorce than change banks. But it's not that traumatic., The Independent, Nov. 7, 1998.*

Kirsty Greenwood and Nic Cicutti, "Personal Finance: Switching isn't hard to do: More people divorce than change banks. But it's not that traumatic." *Independent*, Nov. 7, 1998, 5 pages.

Conal Gregory, "It can pay to watch out for those hidden bank charges," *Scotsman*, p. 37, Jan. 23, 1999, 2 pages.

U.S. Appl. No. 10/033,593, filed Dec. 28, 2001.

U.S. Appl. No. 10/033,592, filed Dec. 28, 2001.

U.S. Appl. No. 10/300,145, filed Nov. 20, 2002.

Office Action dated Jun. 7, 2007 in U.S. Appl. No. 10/033,593.

Office Action dated Jan. 25, 2008 in U.S. Appl. No. 10/033,593.

Office Action dated Sep. 8, 2008 in U.S. Appl. No. 10/033,593.

Office Action dated Jun. 17, 2009 in U.S. Appl. No. 10/033,593.

Office Action dated Mar. 2, 2007 in U.S. Appl. No. 10/033,592.

Office Action dated Nov. 28, 2007 in U.S. Appl. No. 10/033,592.

Office Action dated Apr. 29, 2009 in U.S. Appl. No. 10/033,592.

Office Action dated Aug. 7, 2007 in U.S. Appl. No. 10/300,145.

Office Action dated May 8, 2008 in U.S. Appl. No. 10/300,145.

Office Action dated Jan. 13, 2009 in U.S. Appl. No. 10/300,145.

U.S. Appl. No. 12/822,550, filed Jun. 24, 2010.

Office Action dated Nov. 15, 2010 in U.S. Appl. No. 12/774,394.

Notice of Allowance dated Oct. 13, 2010 for U.S. Appl. No. 10/300,145, filed Nov. 20, 2002.

Diana Hancock, James A. Wilcox, David B. Humphrey, "Intraday management of bank reserves: the effects of caps and fees on daylight overdrafts," *Journal of Money, Credit & Banking*, Nov. 1996, v 28, n 4, pp. 870-919, printed from http://www.dialogweb.com/cgi/dwclient?req=1262463962662, Internet site, accessed on Jan. 2, 2010, 26 pages.

Notice of Allowance dated Jan. 14, 2010 for U.S. Appl. No. 10/033,592, filed Dec. 28, 2001.

Office Action dated Dec. 22, 2009 in U.S. Appl. No. 10/300,145.

* cited by examiner

| | | | | |
|---|---|---|---|---|
| To: | 08093 - PGH Healthcare | | Segment: | Healthcare |
| From: | Mary Odrep | | Recorded Line: | 412-766-9223 |
| Subject: | Client Overdraft | | Date: | 1/1/2002 |

82

54 — Date Overdrawn: 1/1/2002
— Client Name: MG Industries
84 — Account #: 12345678

Amount of Overdraft/Uncollected:      $85.10 (L)      $150.02 (U)
86 — Ledger or Uncollected Type:    L Product/Error Type/Category:     DDA : C : NSF : Posting Debits Exceeded Balance/Credits
88 — Product:    DDA       Error Type:    C       Category:    NSF
                                     90                              92

OD Rep - Comment/Reason:
94 — Client Error. ACH debit payment drew against insufficent funds. Account is still od this am. Client advises she will be making a dep and more deposits are expected. Penalty assessed through analysis.

Disposition Code:    PUC
96

FIG. 5A

Product/Error Type/Category Codes:

| Product & Error Code | |
|---|---|
| DDA : C : CAA : Account Analysis Fees not funded | To be used when the client's negative balance is the result of their Corporate Account Analysis fees posting to the account without proper funding. The fees could be for the exact amount of the overdraft or slightly different depending on the beginning available position in the account. |
| DDA : C : LC : Letter of Credit Transactions Not Funded | To be used when the account is overdrawn due to letter of credit fees or transactions posting to the account without proper funding. The client is aware of the debits. |
| DDA : C : LOCF : Line of Credit at Full Commitment | To be used when the client has exhausted the total amount of their established credit line. |
| DDA : C : NF : Not Funded | To be used when the client's debit activity posts to the account without proper funding. For example, if an ACH debit or ZBA transfer posts to an account that has no available balance or incoming credit activity. |
| DDA : C : NSF : Posting Debits Exceeded Balance/Credits | To be used when funding is not sufficient to cover checks or debits posting to the account that exceeded the available balance. |
| DDA : C : RI : Return of deposited item | To be used when the client's account is overdrawn/uncollected due to return items or ACH return items that equal or exceed the negative balance. |
| DDA : C : UUF : Use of Uncollected Funds | To be used when the client's debit transactions (ACH, wires, internal transfers, etc.) draw against unavailable funds. The debit items could be for the exact amount or in excess of the negative position. |
| LBX : B : BC : Business Credit | To be used when a secured loan payment which has been initiated by the financial institution uncollected lockbox deposits. |
| LBX : B : DA : Debit Adjustment | To be used when the client's negative position is caused by an internal debit adjustment/memo that equals or exceeds the negative position. The client is not aware of these transactions on the day they post to the account because they do not appear on current day reporting. |

FIG. 5B

| Disposition | | |
|---|---|---|
| CCH Return Uncollected - Charge | Charge | C |
| CNC Return Uncollected - No Charge | Charge | B |
| CWA Return Uncollected - Waive to Analysis | Charge | C |
| OCH Paid - Charge | Waive | C |
| ONC Paid - No Charge | Waive | B |
| OWA Paid - Waive to Analysis | Waive | C |
| PUC Paid Uncollected - Charge | Waive | C |
| PUN Paid Uncollected - No Charge | Waive | B |
| PWA Paid Uncollected - Waive to Analysis | Waive | C |
| VCH Return - Charge | Charge | C |
| VNC Return - No Charge | Charge | B |
| VWA Return - Waive to Analysis | Charge | C |

FIG. 5C

Edit Document | Print | Expand All | Collapse All

Client Information Sheet

Name: MG Industries

▸ General Information

▸ Internal Contact Section

▸ Overdraft Desk Section

FIG. 6

Name: MG Industries

General Information

Cost Center:

| | |
|---|---|
| Lead CC: | 08093 |
| Name: | PGH Healthcare |
| Manager: | Jon Jonathon |
| Phone: | 412-555-1212 |
| Segment: | Healthcare |
| AA: | Susy Smith |
| Related CC: | 080278, 08093 |

Client Information:

| | |
|---|---|
| Address 1: | 555 Smith Street |
| Address 2: | Dept A |
| City, State, Zip | RIDGEFIELD PARK   NJ 07660-2105 |

| | Area Code | Exchange | Number |
|---|---|---|---|
| Phone: | 412 | 555 | 1212 |
| Fax: | 412 | 555 | 1212 |

FIG. 7

| Internal Contact Section | |
|---|---|
| Contacts: | |
| RM /Commercial AM: | Elaine Jones |
| Title: | Relationship Manager |
| Phone: | 412-555-1212 |
| Fax: | 412-555-1213 |

122

| Power1 TM: | |
|---|---|
| TM Name: | Joe Smith |
| Title: | Treasury Management Officer |
| TM Phone: | 412-555-1212 |

124

126

PM Name:
  Title:
  Phone:

128

Commercial RM:
  Title:

| ODR Name: | Mary Odrep |
|---|---|
| Title: | Overdraft Representative |
| Phone: | 412-555-1212 |
| Fax: | 412-555-1212 |
| RL: | 412-555-1212 |

▼ Overdraft Desk Section

140　Primary Contact:　Jenny Primcontact
　　Title:
　　Phone:　　　　　412-555-1212

Secondary Contact:
　　Title:
　　Phone:

Approval Designates:

142
| AD Name: | Albert Adcontact | | |
|---|---|---|---|
| AD Title: | Relationship Manager | Pager: | |
| AD Phone: | 412-555-1212 | Home: | 412-555-1212 |
| | | Cell: | 412-555-1212 |

144
| AD1 Name: | Brian Contact | | |
|---|---|---|---|
| AD1 Title: | Business Development Officer | Pager: | |
| AD1 Phone: | 412-555-1212 | Home: | 412-555-1212 |
| | | Cell: | 412-555-1212 |

146
| AD2 Name: | Ann Manager | | |
|---|---|---|---|
| AD2 Title: | Sector Service Manager | Pager: | |
| AD2 Phone: | 412-555-1212 | Home: | 412-555-1212 |
| | | Cell: | |

List of TM Accounts

148
| Product | Account # | Account Description | Market |
|---|---|---|---|
| ACH | 99999999 | | 001:PGH |
| LBX | 09090909 | | 001:PGH |

150
　Special Handling Instructions:

152
　Should OD Desk Contact Client?:
　Yes or No?:　Yes
　Comments:

154
　Please provide any additional information on this client that would assist in processing overdrafts, uncollected or daylight overdrafts:

Required Approval(s)  
Elaine Jones  
Relationship Manager

Electronic Signature  
Elaine Jones  
12/10/2001 10:54:40 AM

FIG. 12

Risk Management
Chronic Response Memo

Risk Oversight Section

Oversight Rep: Mary Ovrep

Market and CC:     PGH Healthcare
Customer:          MG Industries
Account:           12345678
Power ID:          0000099999

| | | | |
|---|---|---|---|
| Segment | PGH Healthcare | Obligor | N/R |
| AM/RM | Elaine Jones | Date Identified | 01/02/2002 |
| TMO | Joe Smith | Rpt Identified On | Daily Accumulative Report |
| OD Rep | Mary Odrep | Acct Position | Ledger |
| Status | Pending | Client or Bank Error | Client |
| Oversight Last Updated | 01/02/2002 | Fee Disposition | Assessed |

Product/Error Type/Category                Outstanding CAA Fees
Posted Items Exceeding Available Balance

Oversight Comments

1/4/02 - Reviewed. Account has had 1 OD and 1 Uncollected OD since last review. Notice not sent based on recent RM comments. Will keep as Pending for now.

1/3/02 - Reviewed. This account is now experiencing uncollected overdrafts rather than ledger ODs and they seem to be occurring less frequently. Please contact the OD desk to have these standing instructions changed to charge if that is your intention per your comments for future uncollected & ledger overdrafts. notification sent 1/2/02 - Reviewed. This account has a daily uncollected position due to check presentments and ACH debits that post against unavailable teller deposits. While the OTC deposits are frequent, they are drawing on total deposits rather than their available. Per the OD documents, the Overdraft desk Rep makes a daily call to the client to get funding information. Notification sent

Officer Section

RM/TM Comments

1/2/2002 09:19:15 AM by Elaine Jones - The owner of this business is a long time client. He historically responds to RM calls regarding NSF incidents and funds the accounts. However, the number of NSF incidents have become too frequent and he has been informed that it must be cleaned up. Also, future occurences will be charged.

| | | | |
|---|---|---|---|
| Created By: | Mary Ovrep | Date: | 01/02/2002 09:57:25 AM |
| Modified By: | Mary Ovrep | Date: | 01/04/2002 12:27:09 PM |

FIG. 13

All Accounts view:

| | Client | Status | Mkt/CC | Oversight Rep |
|---|---|---|---|---|
| ▼ 111111111 | | | | |
| | MG Sporting Goods | Resolved | PGH Healthcare | May Ovrsp |
| ▼ 111111112 | | | | |
| | MG Foods | Pending | PGH Healthcare | May Ovrsp |
| ▼ 12345678 | | | | |
| | MG Industries | Long Term | PGH Healthcare | May Ovrsp |
| ▼ 222222222 | | | | |
| | MG LLC | Pending | PGH Healthcare | May Ovrsp |
| ▼ 99999999 | | | | |
| | MG Toys | Pending | PGH Healthcare | May Ovrsp |

Chronic Overdraft Views
- Active Chronics
- by Segment
- by AM/RM
- by TM
- by Mkt/CC
- by Reason
- by Status
- by Dispn
- All Accounts
- by Oversight Rep Reports DB
Feedback

FIG. 14B

METHODS AND SYSTEMS FOR ANALYZING THE STATUS OF AN ENTITY AND ITS FINANCIAL TRANSACTIONS

CROSS REFERENCE TO RELATED APPLICATION

The present patent application is a continuation of U.S. patent application Ser. No. 10/033,596, filed on Dec. 28, 2001 now abandoned.

BACKGROUND OF THE INVENTION

1. Field of the Invention

The present methods and systems generally relate to receiving, processing, communicating and analyzing data related to financial transactions.

2. Description of the Related Art

Many financial institutions such as corporate banks, for example, provide clients with a wide range of financial services, including loan services and cash management services. The use of these financial services occasionally results in an overdraft or negative financial position associated with a particular service. The decision by the financial institution on how to address the overdraft occurrence, including whether to assess charges against the client, is dependent on a number of factors. Examples of such factors include the prior history of the client with the financial institution and promised actions by the client to address the overdraft occurrence. In any event, the financial institution needs to analyze the cause of the overdraft in an effective manner.

For example, if an overdraft occurrence in a client account results from a bank error in posting deposits or debiting withdrawals, the bank could extend credit to the client without imposing overdraft charges. However, when the client is a chronic offender of permitting an account balance to fall into a negative position, the bank might decide not to extend credit and impose an overdraft charge on the client. It can be appreciated that the decision by the financial institution for each overdraft situation depends on accessibility of information related to the details of the transaction and any actions of the client that may have caused the overdraft occurrence.

In conventional practice, a manager for a given client has primary responsibility for researching overdraft occurrences and deciding whether to pay or return overdraft items with or without imposing charges on the client. In view of the increasing volume of transactions conducted by various clients, it has been recognized that centralized processing of overdrafts could provide an enhanced degree of risk oversight and promote processing efficiencies. Employment of one or more overdraft representatives has become necessary to review and research overdraft information on a periodic basis. Typically, on a daily basis, a team of overdraft representatives submits written overdraft reports to the manager responsible for a particular client account. The managers review the submitted information and determine how to dispose of the overdraft condition. This approval usually requires a signed paper copy of the overdraft report to be faxed and mailed back to the centralized overdraft representative function for archiving.

It can be seen, however, that this manual process does not value the time of the manager involved with resolving a significant volume of overdraft transactions. Nor does this process sufficiently frustrate efforts by unscrupulous clients conducting "check kiting" schemes, for example, and other similarly fraudulent activities associated with overdraft conditions. Since there is inherent delay in manual processing of information related to the financial status of a client, such schemes can be difficult to detect and halt. Moreover, federal laws and regulations related to financial transactions generally require quick decisions on the disposition of items applied to a client account. All of these factors drive the need for more effective processing and communication of overdraft related data.

It has become evident that an effective centralized overdraft effort can have improved access to client information and more efficient means for communicating overdraft occurrences to managers. This overdraft effort can also have scalability in its processes sufficient to address the needs of the many managers in the financial institution, and not merely service a few select departments. Methods and systems are needed that permit overdraft representatives to communicate their analysis of overdraft occurrences to managers and promptly dispose of those occurrences. Methods and systems are also needed that permit managers and others to view current and historical summaries of overdraft occurrences and identify and address trends that impact the policies of the financial institution.

SUMMARY

Methods and systems are provided for processing the financial information of a client of a financial institution. One method embodiment includes receiving data from an overdraft data source including at least one overdraft occurrence associated with a transaction performed in association with the client; analyzing the overdraft occurrence in an overdraft application to determine a cause and disposition of the overdraft occurrence in connection with the cause of the overdraft occurrence; and, communicating an overdraft report associated with the analyzing step to a manager associated with the client. Additional system and computer-readable medium embodiments of the present methods are also provided.

In another aspect of the present methods and systems, overdraft issues are analyzed and reported to the management of a financial institution. System and computer-readable medium embodiments of these analysis and reporting methods are also provided.

BRIEF DESCRIPTION OF THE FIGURES

FIG. 5A is an example of a screen display provided in accordance with an embodiment of a method and system for processing financial data;

FIG. 5B is a tabulation showing examples of information that can be displayed in a portion of FIG. 5A;

FIG. 5C is a tabulation showing examples of information that can be displayed in a portion of FIG. 5A;

FIG. 6 is an example of a screen display provided in accordance with an embodiment of a method and system for processing financial data;

FIG. 7 is an example of a screen display provided in accordance with an embodiment of a method and system for processing financial data;

FIG. 8 is an example of a screen display provided in accordance with an embodiment of a method and system for processing financial data;

FIG. 9 is an example of a screen display provided in accordance with an embodiment of a method and system for processing financial data;

FIG. 11 is an example of a screen display provided in accordance with an embodiment of a method and system for processing financial data;

FIG. 12 is an example of a screen display provided in accordance with an embodiment of a method and system for processing financial data;

FIG. 13 is an example of a response provided in accordance with an embodiment of a method and system for processing financial data;

DETAILED DESCRIPTION

Figure 1:
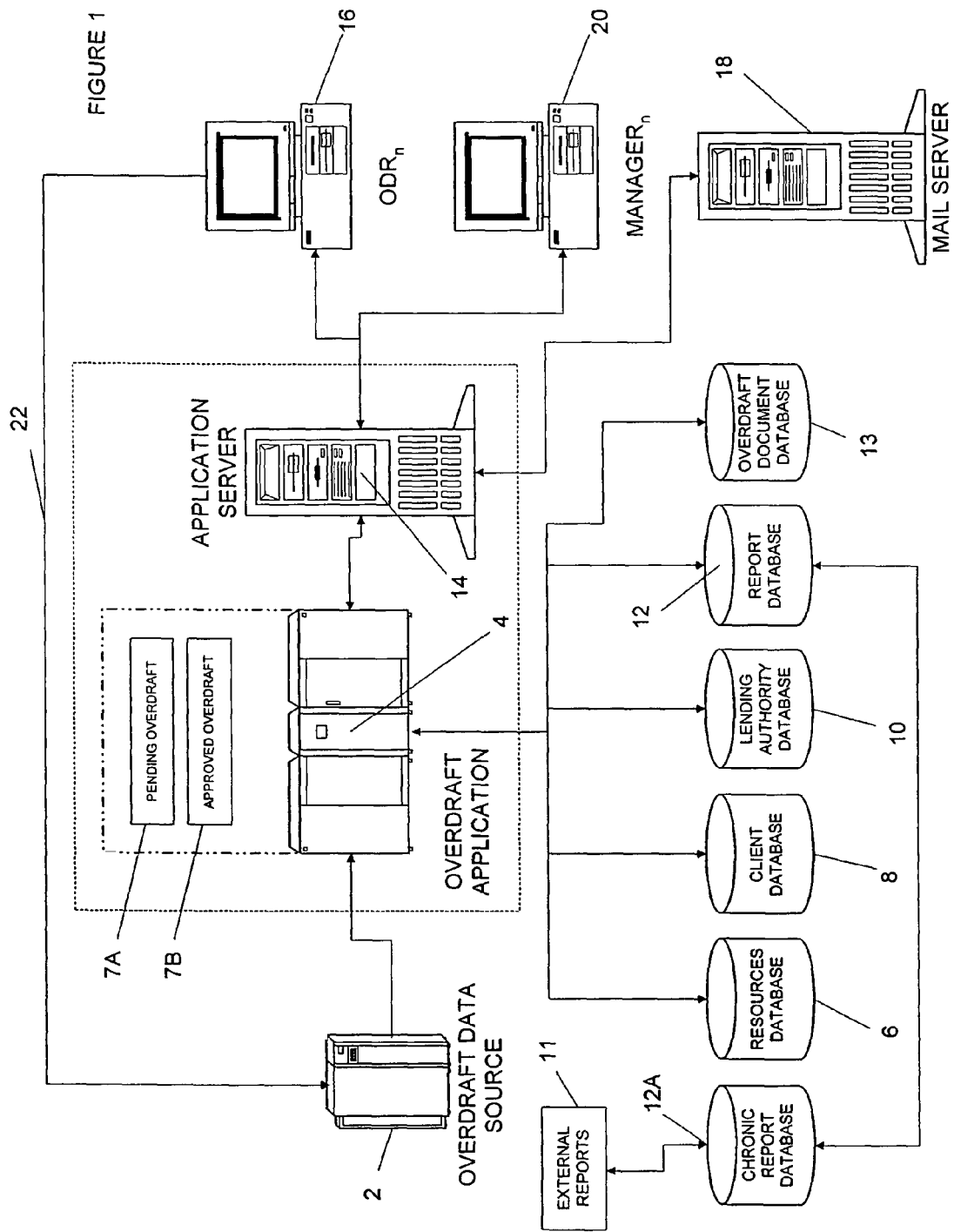
FIG. 1 is a schematic diagram depicting one embodiment of a system for processing data related to one or more overdraft occurrences in a financial institution.

The term "overdraft" as applied herein includes the condition of having a negative financial position such as, for example, a negative checking account balance caused by a request to draw more funds from the account than were available at the time of the withdrawal request.

Referring now to the figures, methods and systems are provided for receiving information related to the financial status of a client including, for example, occurrences of overdraft conditions associated with transaction of financial items conducted by the client. Data is received from an overdraft data source 2 which can be a main frame computer, for example, including a batch of accounts that reflect an overdraft condition in one or more accounts of one or more clients. These clients can include, for example, commercial entities that access a financial service provider such as a commercial banking institution. These financial institutions include service providers that may provide savings accounts, checking accounts, loans, and other similar financial products to the commercial entities. Items used in financial transactions can include, for example, checks drawn against a checking account, debits, loan payments and the like.

The overdraft data source 2 identifies negative positions, including overdraft occurrences, in one or more client accounts. In one embodiment, these overdraft occurrences are sorted by the name or other identifying indicia of an overdraft representative 16 ("ODR"), who is responsible for reviewing, researching and documenting the circumstances of a given overdraft occurrence. The overdraft data source 2 generates an extract that is adapted for import into an overdraft application 4. The overdraft application 4 can be embodied, for example, as one or more software applications programmed into the "LOTUS NOTES" environment. The overdraft application 4 includes, among other things, a resources database 6, a client database 8, a lending authority database 10, a report database 12, and an overdraft document database 13. In addition, a chronic report database 12A is provided in connection with the report database 12. In one aspect of the present methods and systems, one or more reports can be generated in the chronic report database 12A based on one or more criteria associated with client accounts. The chronic report database 12A may also interact with external reports 11 to generate overdraft information for one or more clients. Each of these databases 6, 8, 10, 12, 12A, and 13 is operatively associated with the overdraft application 4 and each is described hereinafter in further detail.

In step 32 of one method embodiment, a conventional software program reads an extract file, which is generated in the overdraft data source 2, and which includes overdraft occurrence data associated with one or more overdraft occurrences. This software program loads the overdraft occurrence data into the overdraft application 4. The overdraft application 4 assigns each overdraft occurrence to an overdraft representative ODR 16 for further processing. This assignment of overdraft occurrences can be accomplished by requiring that a particular ODR 16 be responsible for a particular characteristic of the overdraft occurrence such as, for example, in which cost center of the financial institution the client is serviced.

Figure 3:
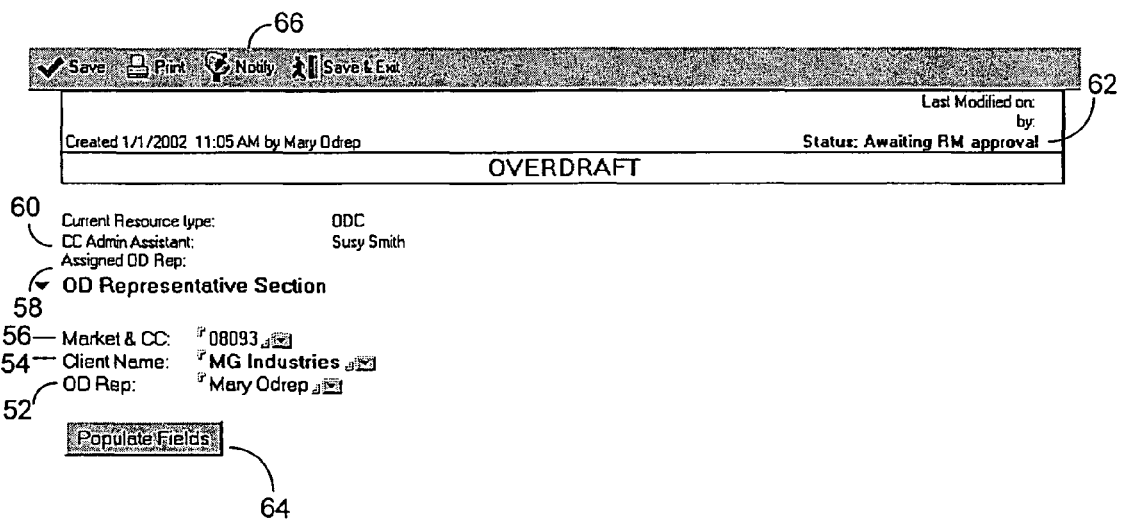
FIG. 3 is an example of a screen display provided in accordance with an embodiment of a method and system for processing financial data.

In one embodiment of the present methods and systems, an ODR 16 logs in to the overdraft application 4 through a conventional application server 14 and accesses the overdraft application 4. In one example embodiment of the present methods and systems, FIG. 3 shows the view seen by an ODR 16 in the overdraft database 13 when the ODR 16 opens an overdraft report associated with an overdraft occurrence. The overdraft database 13 includes data related to one or more pending overdraft occurrences 7A and one or more approved overdraft occurrences 7B. It can be appreciated that one or more fields and/or action buttons on an overdraft report can be configured to be seen only by a particular ODR 16 or group of ODR's 16. In one embodiment of the present methods and systems, this configuration of visible and non-visible functionality is determined by the security level assigned to the user within the resources database 6.

Figure 4A:
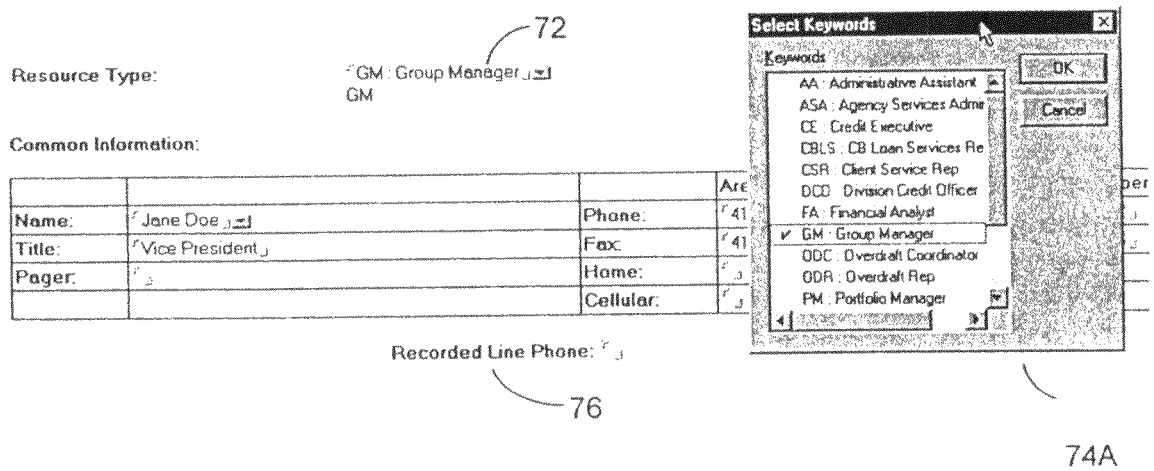
FIG. 4A is an example of a screen display provided in accordance with an embodiment of a method and system for processing financial data.
Figure 4B:
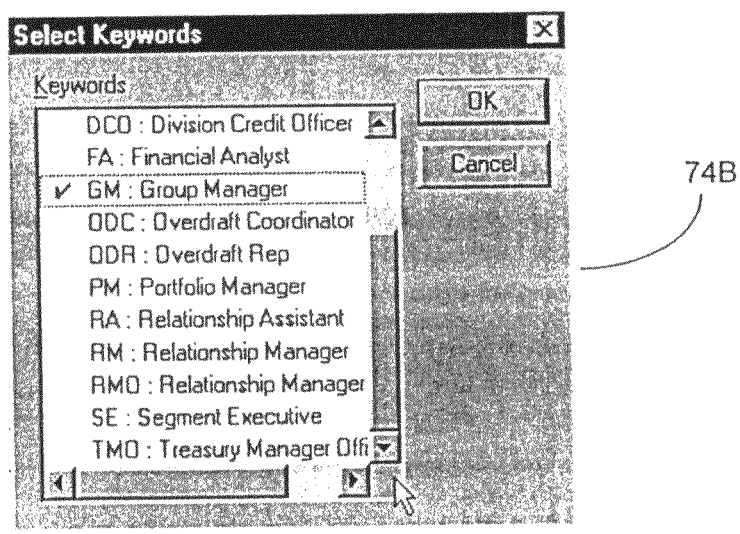
FIG. 4B is an enlarged, sectional view showing an undisplayed portion of FIG. 4A.

FIGS. 4A and 4B show a user document contained within the resources database 6. This user document can be employed to record data associated with a user such as name, title, contact information and the like, as well as a resource type, in field 72 for the user. Examples of selections for designating the resource type in field 72 for a user are shown in the menu listings of displays 74A and 74B. In one aspect, the user document can also be used to specify what approval authority a particular user possesses to approve a recommended action for a given overdraft occurrence. This approval authority can include the authority, for example, to approve overdraft occurrences up to a predetermined dollar amount limit. In addition, in one aspect of the present methods and systems, approval authorities only have the ability to decide the disposition of the overdraft occurrence and add comments to the overdraft report but cannot alter other data shown on the overdraft report.

In another aspect of the user document of FIGS. 4A and 4B, a recorded line phone number can be inserted in field 76 to indicate a phone line that can be used to record conversations between the ODR 16 and other personnel who may be contacted to resolve a particular overdraft occurrence. It can be appreciated that recordings obtained from use of the recorded phone line can be employed in research and analysis performed by the ODR 16 and others.

Referring again to FIG. 3, the ODR 16 designated in field 52 can review, for example, a client name in field 54 and market and cost center information in field 56 in association with the overdraft occurrence. The market and cost center code entered in field 56 is typically related to geographical and/or industry information for a client. One market/cost center code, for example, may indicate that a particular client is in a Philadelphia, Pa. market and is in the health care industry. As can be seen, an assigned ODR representative in field 58 may be available for a given client's overdraft occurrences. In addition, an administrative assistant who can serve as a recipient of copies of correspondence such as correspondence related to an overdraft occurrence, for example, can be shown in field 60. As discussed further hereinbelow, the administrative assistant entered in field 60 may need to coordinate efforts with an approval authority designee to decide on an action or actions to be taken in response to an overdraft occurrence. The status of a particular overdraft occurrence can also be displayed in field 62 as shown.

Once this information is validated, the ODR 16 can click a "Populate Fields" button 64 and the overdraft application 4 automatically completes information on one or more fields contained on the overdraft report. The "Populate Fields" button 64 can also enter data into the overdraft report from the client database 8 and the resources database 6. The overdraft application 4 also draws information from the lending authority database 10 to enter one or more approval authorities who will approve the disposition of the overdraft occurrence. The results of pushing the "Populate Fields" button 64 are shown in FIG. 5A.

As shown in FIG. 5A, an illustration of a populated overdraft report is provided with various fields of information related to an overdraft occurrence. The date of the overdraft is shown in field 82 and the account overdrawn is shown in field 84. Information on the dollar amount and type of the overdraft occurrence is shown in portion 86 of the overdraft report. The report also presents information on the product (field 88), the error type (field 90), and the category (field 92) associated with the overdraft occurrence. Examples of entries for fields 88, 90 and 92 are illustrated in the tabulation of FIG. 5B. Comments on the overdraft occurrence can be entered by the ODR 16 in field 94 as shown. In addition, a disposition code can be entered in field 96 to instruct one or more systems on resolution of the overdraft occurrence. Examples of disposition codes that can be entered in field 96 are shown in FIG. 5C.

FIGS. 6 through 9 illustrate aspects of an example embodiment of the client database 8. FIG. 6 is an initial screen shown upon entry into the client database 8 that includes links to a "General Information" section (FIG. 7), an "Internal Contact Section" (FIG. 8) and an "Overdraft Desk Section" (FIG. 9). FIG. 7 shows the General Information section, which includes information about the client including, for example, market/cost center, segment, administrative assistant (AA), and other data associated with the client. FIG. 8 shows the Internal Contact Section, which includes data related to personnel of the financial institution who are assigned to a particular client. As shown, these personnel can include relationship managers—RM's (122, 128); account managers—AM's (122); treasury managers—TM's (124); and portfolio managers—PM's (126); among others, as well as an ODR 16 (130) associated with the client.

FIG. 9 shows the Overdraft Desk Section which includes contact information and approval designates for use in researching, analyzing and resolving overdraft occurrences associated with a given client. Sample client contact information is shown in portion 140 of this section. Examples of approval designates suitable for approving overdraft occurrences for a given client are shown in fields 142, 144 and 146. A list of treasury management accounts can also be seen in portion 148 of this section. Additional instructions and information to assist the ODR 16 in analyzing an overdraft occurrence can also be provided in portions 150, 152 and 154 of this section, as shown in FIG. 9.

In step 34, as shown in FIG. 2 and referring again to FIG. 5A, the ODR 16 performs research to determine the circumstances and reasons surrounding the cause of the overdraft occurrence. The reasons may include a determination that a client error or a financial institution error caused the overdraft occurrence. The observations of the ODR 16 regarding this error are also made accessible in the overdraft application 4 for assessment of chronic overdraft conditions. The ODR 16 may analyze the data to determine, for example, whether the overdraft occurrence is a ledger overdraft or an uncollected overdraft. This research also includes determining the specific transaction that caused the overdraft and whether the client has already funded and thereby cured the overdraft condition. It can be appreciated that many conventional human and computer resources can be used by the ODR 16 to determine the cause of the overdraft occurrence. The observations of the ODR 16 regarding the overdraft occurrence can be entered by the ODR 16 on field 94 of the overdraft report. Information entered into the overdraft report by the ODR 16 can also be made available for use in reviewing and analyzing chronic overdraft conditions associated with a particular client.

Figure 2:
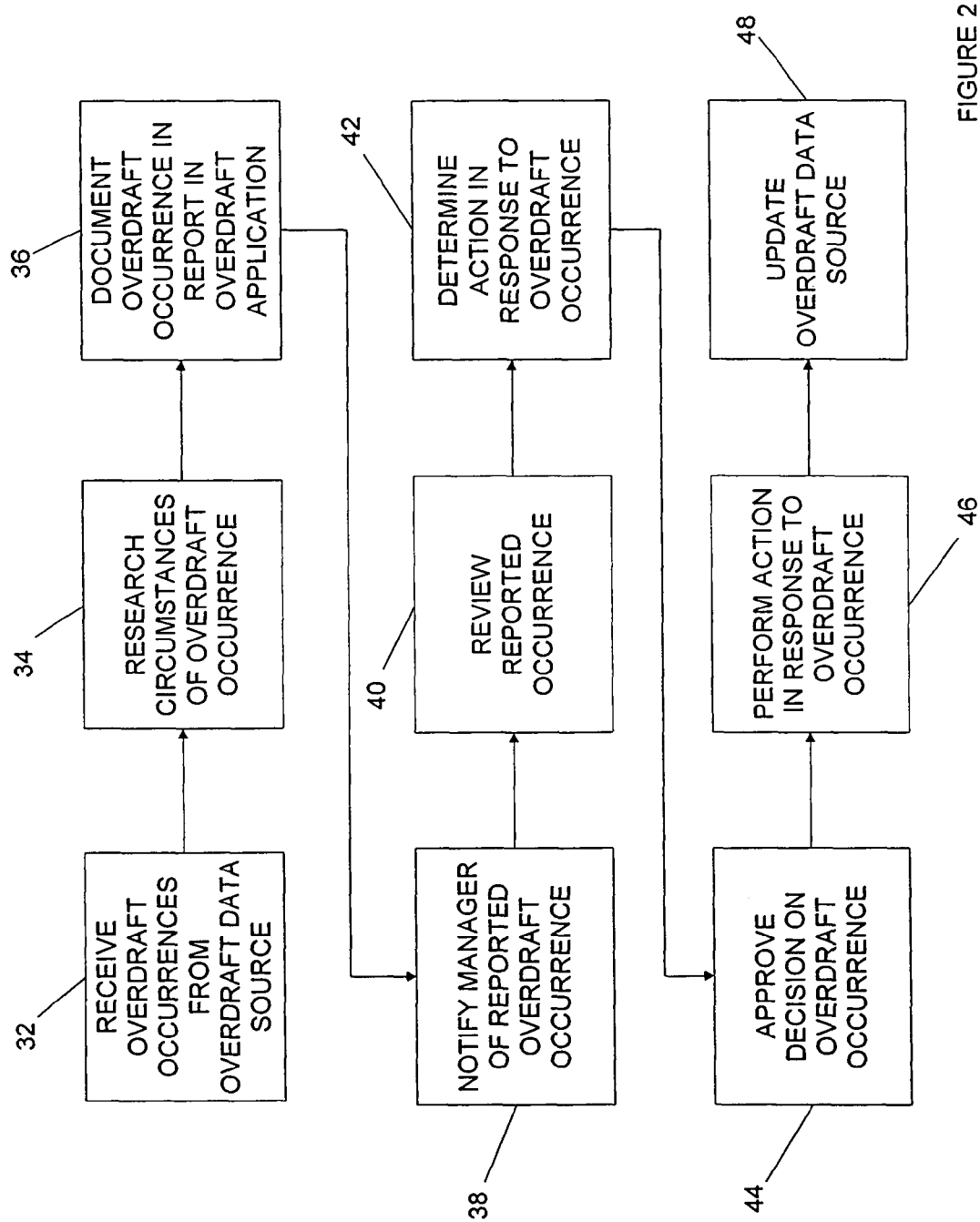
FIG. 2 is a process flow diagram showing one embodiment of a method for processing data related to one or more overdraft occurrences in a financial institution.

In step 36, referring to FIG. 2, in connection with the research of the ODR 16, the overdraft report is further completed by entry of a disposition code in field 96 for the overdraft occurrence as shown in FIG. 5A. A disposition code decides the disposition of the item associated with the transaction that caused the overdraft condition. A disposition code can be defaulted to an action to be taken in the event that a manager does not respond to notification of the overdraft condition. Dispositions can include, for example, pay or return the item that caused the overdraft occurrence with or without charges imposed by the financial institution.

Figures 10A, 10B:
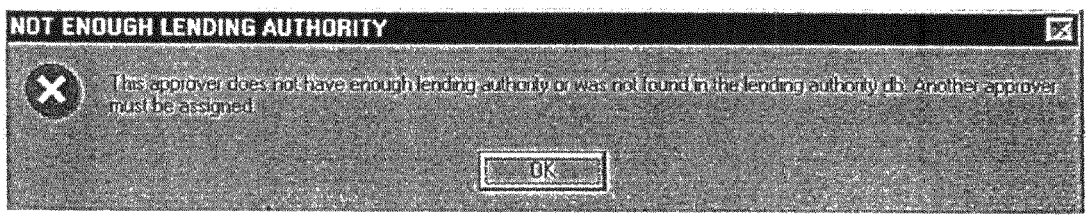
FIG. 10A is an example of a screen display provided in accordance with an embodiment of a method and system for processing financial data.
FIG. 10B is an example of a screen display provided in accordance with an embodiment of a method and system for processing financial data.

Referring now to FIG. 10A, the ODR 16 can select one or more approval authorities/designates (in fields 162, 164 and 166) who can approve ODR 16 analysis of the overdraft occurrence. The ODR 16 can use a "Get Titles" button 168 to retrieve title or other contact information for one or more of the approval authorities. The "Check LA" button 170 can also be pressed by the ODR 16 to confirm whether additional approval designates will be required for approval of the overdraft occurrence. It can be appreciated that more than one approval authority may be required for a given overdraft occurrence based on a number of factors including, for example, the dollar amount of the overdraft occurrence.

In step 38, as shown in FIG. 2, the ODR 16 can press a notify button 66 (as shown in FIG. 3) to provide notification to a manager or other approval authority of the need to approve disposition of the overdraft occurrence. Approval authority alternates can also be provided in the methods and systems for facilitating decisions on overdraft occurrences when the primary approval authority is not accessible to make a decision. For example, an "after hours" approval designee can be chosen to make decisions for those times of the day or night when a primary approval authority is inaccessible to electronic mail, pager, voice mail or other notification means. Notification of an overdraft occurrence can also be forwarded to an approval authority alternate by the primary approval authority, such as in the event that the primary approval authority is not available to review the overdraft occurrence in sufficient detail to make a decision on disposition of the overdraft occurrence.

Notification of the overdraft occurrence can take the form, for example, of an electronic mail sent through a mail server 18 including a link to permit access by a manager 20 to the section of the overdraft application 4 where the overdraft report completed by the ODR 16 resides. In connection with the lending authority database 10, the overdraft application 4 can perform an auto-check of the amount associated with the overdraft occurrence to determine whether additional approval authority is required. In one embodiment of a display shown in FIG. 10B, the overdraft application 4 can be configured not to permit notification to be delivered if this additional approval authority condition is not satisfied.

In one embodiment of the present methods and systems, a manager 20 can go through a link in an electronic mail message or can access the overdraft application directly, as desired, to approve the overdraft report. In another embodiment, reports can be generated in the report database 12 based on the items the manager has approved. FIG. 11 illustrates a sample embodiment of menu screens available to users of the overdraft application 4. As shown in portion 172 of the screen, a report of outstanding overdraft decisions can be generated for managers 20 and ODR's 16 including, for example, "x" and "✓" (i.e., "check mark") indications on the report. In one aspect, these indications can be color-coded such that a green check mark reflects an approved overdraft report; and a red "x" indicates an overdraft report waiting for further action. As shown, the user also has access to a number of buttons in portion 174 of the screen that can activate other screens and systems used in connection with the overdraft application 4.

In steps 40 through 44, as shown in FIG. 2, the manager can review the overdraft report, make a pay/return decision on the outstanding overdraft item and then approve the decision with, for example, an electronic signature entered into the overdraft report (as shown in FIG. 12). In one embodiment, if no decision is made by the manager within a predetermined time period, the system can default, for example, to a "return all" mode in which all outstanding overdraft items are returned to the draw requestor or a "pay all" mode in which all outstanding items are paid to their respective draw requestors. The ODR 16 responsible for the overdraft item receives the decision of the manager in step 46, as shown in FIG. 2, and acts in accordance with that decision. This may involve changing an initial disposition code for the overdraft occurrence to a disposition code consistent with the decision of the manager. This disposition code can then be processed through the overdraft data source 2 in step 48, referring to FIG. 2, through connection 22 in accordance with the actions of the ODR 16. This will typically result in payment of the item with or without a charge to the client, or return of the item with or without a charge to the client.

Figure 14A:
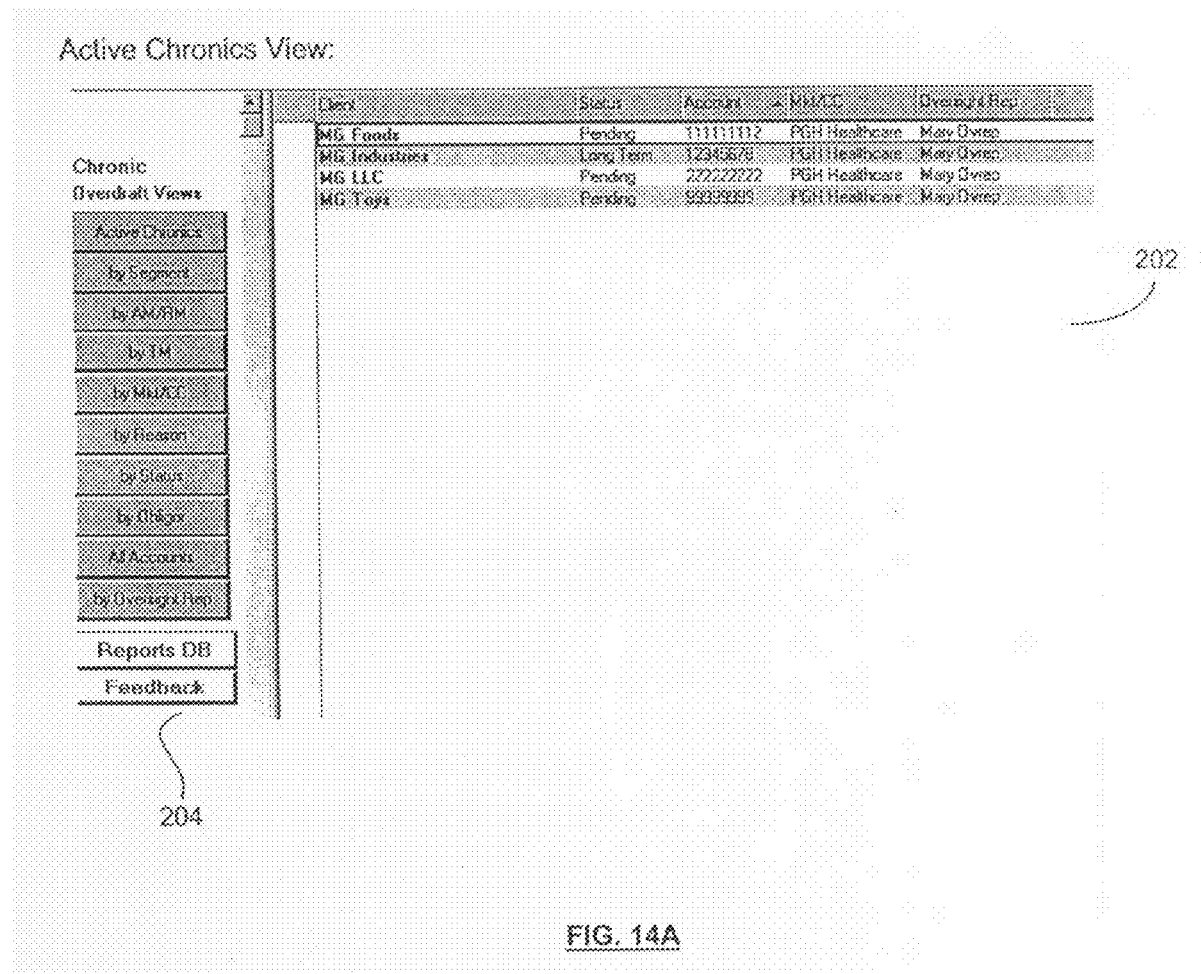
FIG. 14A is an example of a summary report provided in accordance with an embodiment of a method and system for processing financial data; and, FIG. 14B is an example of a sort performed on the summary report of FIG. 14A.

Referring now to FIGS. 13 and 14A and 14B, in another embodiment of the present methods and systems, through analysis of the overdraft history of a given client chronic problems can be identified and addressed in an effective manner. Overdraft occurrences can be reviewed and correlated to any number of factors including, without limitation, segment, market/cost center, and relationship manager responsible for a given client. This permits statistical analysis and quality control efforts to be focused on areas where overdrafts occur with an undesirable level of severity and/or frequency.

A criterion can be established, for example, wherein any client which has three to five or more overdraft occurrences in a given time period, such as a month, is designated for further investigation. Additional examples of other suitable criteria include, without limitation, number of overdraft conditions in a given number of days, number overdraft conditions in a given number of quarters, number of overdraft conditions in a given year, and other like time period measurements associated with overdraft conditions. These criteria can also be combined with the dollar amounts of overdraft conditions to determine whether remedial action is required for a particular client at a certain dollar amount of overdraft occurrence or occurrences. Application of one or more such criteria to a client account or accounts may lead to one or more limitations placed on accounts and/or products employed by the client through the financial institution.

FIG. 13 shows an example of a chronic response memo that can be sent in response to analysis of the financial history of a particular client. This memo can be generated through the chronic report database 12A through its connection with the report database 12 of the overdraft application 4. External reports 11 can also be processed through the chronic report database 12A. These external reports 11 may provide information for analysis of client accounts including, for example, overdraft occurrences over a dollar amount predefined by the financial institution, clients exceeding a predefined number of consecutive days in overdraft condition, a daily accumulation of overdraft occurrences, and other similar reports related to overdraft occurrences.

As shown in the example of FIG. 13, an oversight representative 182 can be associated with a particular chronic response memo. An appropriate officer or other manager responsible for client accounts can be designated such as, for example, a treasury management officer (TMO) in field 184. As discussed above with regard to external reports 11, a number of different sources may be drawn upon to generate the chronic response memo. As shown, the example chronic response memo was generated at least in part by drawing from a daily accumulative report as indicated in field 186. Any outstanding corporate account analysis (CAA) fees can also be noted on the memo as shown in field 188. Comments by an ODR 16 or other person who generated the memo can be included in section 190 of the memo. As can be seen, these comments are typically indicative of the repeated or chronic nature of a particular client's financial transactions with the financial institution. In addition, a relationship manager or treasury manager can add comments to the memo in field 192 that may complement or respond to comments and analysis entered by the person who generated the chronic response memo.

FIG. 14A shows a sample menu screen of choices for displaying various reports associated with the overdraft occurrence history of a particular client. In portion 202 of the screen, a listing of instances of chronic response memos generated for various clients are shown. As shown in portion 204 of the screen, summary reports can be generated for chronic response memos stored in the chronic report database 12A, for example, by active chronics, by segment, by AM/RM, by TM, by Market/Cost Center, by reason, by status, by obligor, by oversight representative, or all accounts. The screen display of FIG. 14B illustrates a list of chronic response memos sorted by an "All Accounts" sort selection. In addition, as shown in FIG. 14A, the user can access the report database 12 and can decide to supply feedback for a chronic response memo from the menu screen.

The benefits of the present methods and systems can be readily seen and appreciated. One benefit is centralization of management control and increased oversight and risk control over processing overdrafts. Another benefit is the capability to assess the current state of the overdraft approval process for a financial institution. Still another benefit is enhanced data processing cycle time and reductions in management time spent on research and support issues.

The examples presented herein are intended to illustrate potential implementations of the present communication method and system embodiments. It can be appreciated that such examples are intended primarily for purposes of illustration. No particular aspect or aspects of the example method and system embodiments described herein are intended to limit the scope of the present invention. The configuration and specific functions of a particular screen display, for example, are provided for convenience of disclosure.

The term "computer-readable medium" is defined herein as understood by those skilled in the art. A computer-readable medium can include, for example, memory devices such as diskettes, compact discs of both read-only and writeable varieties, optical disk drives, and hard disk drives. A computer-readable medium can also include memory storage that can be physical, virtual, permanent, temporary, semi-permanent and/or semi-temporary. A computer-readable medium can further include one or more data signals transmitted on one or more carrier waves.

It can be appreciated that, in some embodiments of the present methods and systems disclosed herein, a single component can be replaced by multiple components, and multiple components replaced by a single component, to perform a given function. Except where such substitution would not be operative to practice the present methods and systems, such substitution is within the scope of the present invention.

Whereas particular embodiments of the invention have been described herein for the purpose of illustrating the invention and not for the purpose of limiting the same, it can be appreciated by those of ordinary skill in the art that numerous variations of the details, materials and arrangement of parts may be made within the principle and scope of the invention without departing from the invention as described in the appended claims. A particular choice of nomenclature to identify an element or elements of the present methods and systems, for example, is intended merely for convenience of disclosure.

What is claimed is:

1. A computer-assisted method for analyzing financial information of a client of a financial institution, said method comprising:
    electronically receiving data from an overdraft data source into a report database including an electronic data storage medium, said report database including information related to at least one overdraft occurrence related to said client;
    electronically analyzing said overdraft occurrence information, wherein said analyzing includes comparing said overdraft occurrence information to at least one criterion;
    generating a response based on said comparison, wherein said response is stored in a chronic report database including an electronic data storage medium operatively associated with said report database;
    receiving an external report in said report database in connection with generating said response;
    associating an overdraft representative with said response, wherein said overdraft representative is responsible for reviewing, researching and documenting circumstances regarding said overdraft occurrence with an electronic application server;
    electronically notifying a manager responsible for said client associated with said overdraft occurrence by transmitting said response to said manager with an electronic mail server, and,
    generating a chronic response memo based at least in part on the external report, wherein the external report comprises
        (i) multiple overdraft occurrences occurring within a predetermined time period, and
        (ii) overdraft occurrences over a predetermined dollar amount associated with the multiple overdraft occurrences.

2. The method of claim 1, wherein said criterion includes a time period associated with at least one of said overdraft occurrences.

3. The method of claim 2, wherein said time period is selected from the group consisting of a number of days, a number of months, a number of quarters, and a year.

4. The method of claim 1, wherein said criterion further includes a dollar amount associated with said overdraft occurrence.

5. The method of claim 1, wherein said external report includes data selected from the group consisting of at least one overdraft occurrence over a dollar amount predefined by the financial institution, a predefined number of consecutive days in overdraft condition, and a daily accumulation of overdraft occurrences.

6. The method of claim 1, wherein said response includes an overdraft occurrence history of said client.

7. The method of claim 1, further comprising displaying more than one of said responses in a summary report.

8. The method of claim 7, further comprising sorting said summary report by a characteristic selected from the group consisting of active chronics, segment, account manager, relationship manager, treasury manager, market/cost center, reason, status, obligor, and oversight representative.

9. The method of claim 1, wherein said generating further comprises documenting one or more reasons for at least one of said overdraft occurrences in said response.

10. The method of claim 1, further comprising facilitating selection of at least one approval authority by the overdraft representative for approval of said overdraft occurrence.

11. A system for processing financial information of a client of a financial institution, said system comprising:
    an overdraft application programmed for receiving data from an overdraft data source, said overdraft application being stored in an electronic data storage medium, said data including at least one overdraft occurrence associated with a transaction performed in association with said client, said overdraft application further programmed for:
        analyzing at least one said overdraft occurrence wherein said analyzing includes comparing said overdraft occurrence information to at least one criterion;
        associating an overdraft representative with said response, wherein said overdraft representative is responsible for reviewing, researching and documenting circumstances regarding said overdraft occurrence with an electronic application server; and,
        notifying a manager responsible for said client associated with said overdraft occurrence by transmitting said response to said manager with an electronic mail server;
    receiving an external report in said report database in connection with generating said response;
    generating a chronic response memo based at least in part on the external report, wherein the external report comprises
        (i) multiple overdraft occurrences occurring within a predetermined time period, and
        (ii) overdraft occurrences over a predetermined dollar amount associated with the multiple overdraft occurrences, and
    an electronic server connection for generating a response associated with said analysis of said overdraft occurrence.

12. The system of claim 11, further comprising at least one report database operatively associated with said overdraft application for generating said response.

13. The system of claim 11, further comprising said overdraft application being configured for facilitating selection of at least one approval authority by the overdraft representative for approval of said overdraft occurrence.

14. A computer-readable medium containing instructions for assisting a computer system to perform a method for analyzing financial information of a client of a financial institution, said method comprising:
receiving data in a report database from an overdraft data source associated with an electronic computing device, said report database including an electronic data storage medium including information related to at least one overdraft occurrence related to said client;
analyzing said overdraft occurrence information with an overdraft application stored in an electronic data storage medium, wherein said analyzing includes comparing said overdraft occurrence information to at least one criterion;
generating a response based on said comparison, wherein said response is stored in a chronic report database including an electronic data storage medium operatively associated with said report database;
receiving an external report in said report database in connection with generating said response;
associating an overdraft representative with said response, wherein said overdraft representative is responsible for reviewing, researching and documenting circumstances regarding said overdraft occurrence with an electronic application server;
notifying a manager responsible for said client associated with said overdraft occurrence by transmitting said response to said manager with an electronic mail server, and,
generating a chronic response memo based at least in part on the external report, wherein the external report comprises
(i) multiple overdraft occurrences occurring within a predetermined time period, and
(ii) overdraft occurrences over a predetermined dollar amount associated with the multiple overdraft occurrences.

15. The medium of claim 14, wherein said criterion includes a time period associated with at least one of said overdraft occurrences.

16. The medium of claim 15, wherein said time period is selected from the group consisting of a number of days, a number of months, a number of quarters, and a year.

17. The medium of claim 14, wherein said criterion further includes a dollar amount associated with said overdraft occurrence.

18. The medium of claim 14, wherein said external report includes data selected from the group consisting of at least one overdraft occurrence over a dollar amount predefined by the financial institution, a predefined number of consecutive days in overdraft condition, and a daily accumulation of overdraft occurrences.

19. The medium of claim 14, wherein said response includes an overdraft occurrence history of said client.

20. The medium of claim 14, further comprising displaying more than one of said responses in a summary report.

21. The medium of claim 20, further comprising sorting said summary report by a characteristic selected from the group consisting of active chronics, segment, account manager, relationship manager, treasury manager, market/cost center, reason, status, obligor, and oversight representative.

22. The medium of claim 14, wherein said generating further comprises documenting one or more reasons for at least one of said overdraft occurrences in said response.

23. The medium of claim 14, wherein the method further comprises facilitating selection of at least one approval authority by the overdraft representative for approval of said overdraft occurrence.

24. A computer-assisted method for analyzing financial information of a client of a financial institution, said method comprising:
receiving data from an overdraft data source into a report database from an electronic computing device in communication with the report database, said report database including an electronic data storage medium including information related to at least one overdraft occurrence related to said client;
analyzing said overdraft occurrence information with an overdraft application stored in an electronic data storage medium, wherein said analyzing includes comparing said overdraft occurrence information to at least one criterion;
generating a response based on said comparison, wherein said response is stored in a chronic report database including an electronic data storage medium operatively associated with said report database;
receiving an external report in said report database in connection with generating said response;
associating an overdraft representative with said response, wherein said overdraft representative is responsible for reviewing, researching and documenting circumstances regarding said overdraft occurrence with an electronic application server;
entering a disposition code for the overdraft occurrence;
notifying a manager responsible for said client associated with said overdraft occurrence by transmitting said response to said manager with an electronic mail server; and,
generating a chronic response memo based at least in part on the external report, wherein the external report comprises
(i) multiple overdraft occurrences occurring within a predetermined time period, and
(ii) overdraft occurrences over a predetermined dollar amount associated with the multiple overdraft occurrences.

25. The method of claim 24, wherein said disposition code is associated with a default action to be taken in the event the manager does not respond to said notification.

26. The method of claim 24, wherein said criterion includes a time period associated with at least one of said overdraft occurrences.

27. The method of claim 24, wherein said criterion further includes a dollar amount associated with said overdraft occurrence.

28. The method of claim 24, wherein said external report includes data selected from the group consisting of at least one overdraft occurrence over a dollar amount predefined by the financial institution, a predefined number of consecutive days in overdraft condition, and a daily accumulation of overdraft occurrences.

29. The method of claim 24, wherein said response includes an overdraft occurrence history of said client.

30. The method of claim 24, further comprising displaying more than one of said responses in a summary report.

31. The method of claim 30, further comprising sorting said summary report by a characteristic selected from the group consisting of active chronics, segment, account manager, relationship manager, treasury manager, market/cost center, reason, status, obligor, and oversight representative.

32. The method of claim 24, wherein said generating further comprises documenting one or more reasons for at least one of said overdraft occurrences in said response.

33. A system for processing financial information of a client of a financial institution, said system comprising:
   an overdraft application programmed for receiving data from an overdraft data source, said overdraft application stored in an electronic data storage medium, said data including at least one overdraft occurrence associated with a transaction performed in association with said client, said overdraft application programmed for:
   analyzing at least one said overdraft occurrence wherein said analyzing includes comparing said overdraft occurrence information to at least one criterion; wherein said criterion includes a time period associated with at least one of said overdraft occurrences, wherein said time period is selected from the group consisting of a number of days, a number of months, a number of quarters, and a year, and wherein said criterion further includes a dollar amount associated with said overdraft occurrence;
   receiving an external report in said report database in connection with generating said response;
   associating an overdraft representative with said response, wherein said overdraft representative is responsible for reviewing, researching and documenting circumstances regarding said overdraft occurrence with an electronic application server; and,
   notifying a manager responsible for said client associated with said overdraft occurrence by transmitting said response to said manager with an electronic mail server;
   generating a chronic response memo based at least in part on the external report, wherein the external report comprises
      (i) multiple overdraft occurrences occurring within a predetermined time period, and
      (ii) overdraft occurrences over a predetermined dollar amount associated with the multiple overdraft occurrences, and
   an electronic server connection programmed for generating a response associated with said analysis of said overdraft occurrence.

* * * * *